B. W. McClure.

Horse Collar.

N° 88,400.　　　　　　Patented Mar. 30, 1869.

WITNESSES:　　　　　　　　　　　　INVENTOR:

B. W. McCLURE, OF WYOMING, IOWA.

Letters Patent No. 88,400, dated March 30, 1869.

IMPROVED HORSE-COLLAR.

The Schedule referred to in these Letters Patent and making part of the same.

*To all whom it may concern:*

Be it known that I, B. W. McCLURE, of Wyoming, in the county of Jones, and State of Iowa, have invented a new and useful Improvement in Horse-Collars; and I do hereby declare that the following is a full, clear, and exact description thereof, which will enable others skilled in the art to make and use the same, reference being had to the accompanying drawings, forming part of this specification, in which—

Similar letters of reference indicate corresponding parts.

Figure 1:
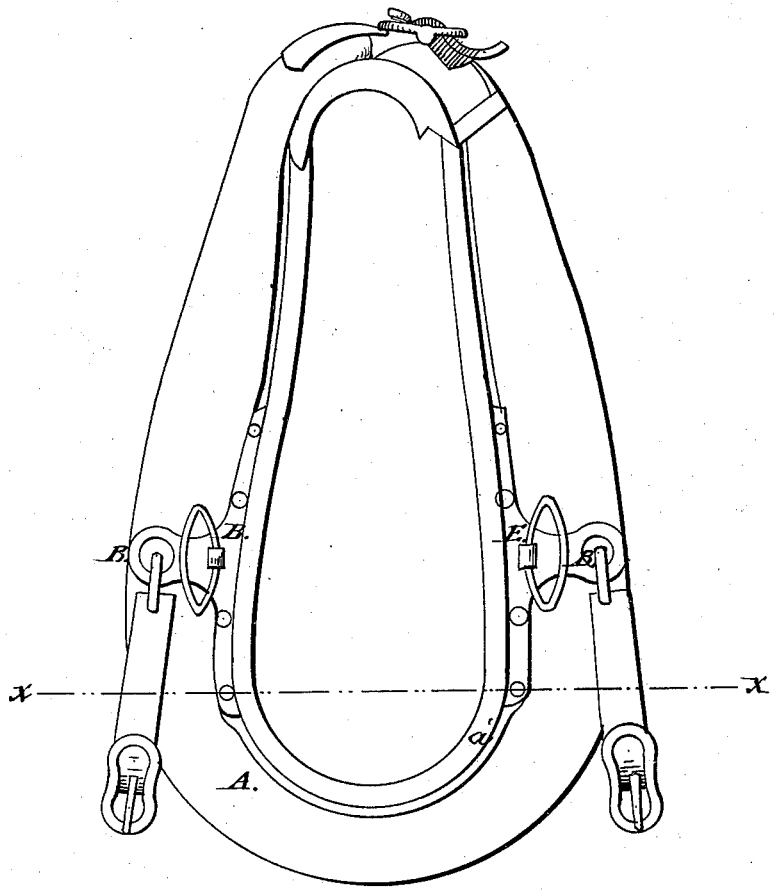
Figure 1 is a front view of my improved horse-collar.
Figure 2:
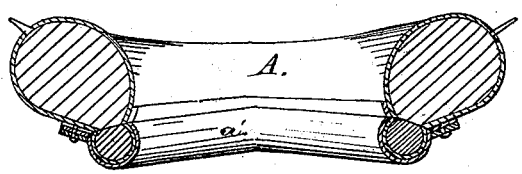
Figure 2 is a detail sectional view of the same, taken through the line $x\ x$, fig. 1.

My invention has for its object to furnish a simple, convenient, and cheap horse-collar, which shall be so constructed that it may be used without hames; and It consists in the construction of the collar, as hereinafter more fully described.

A is the collar, which is made and stuffed in the ordinary manner.

The covering of the inner side, or that part of the collar which comes in contact with the neck and shoulders of the horse, should be made of soft, pliable leather, or other suitable material.

The covering of the outer, or forward part of the collar is made of raw hide, brought into the proper shape, and securely sewed, at its edges, to the outer parts of the collar.

The hames-rim, $a'$, of the collar is made smaller than is required when hames are used, and is bound with raw hide.

The outer edge of the raw-hide binding, that forms, or covers the rim $a'$, is extended where it is passing over the shoulders of the horse; and to the said extended edge are securely riveted, or otherwise attached, the hames-tug ears B, which receive the eyes of the hames-tugs, said hames-ears, when sustaining the draught-strain, resting upon the outer side of the collar A.

The raw hide, of which the covering of the outer part of the collar is formed, when dry and set, retains its position perfectly, and renders the use of hames entirely unnecessary.

Having thus described my invention,

I claim as new, and desire to secure by Letters Patent—

An improved horse-collar, the covering of the outer part, or side of which is made of raw hide, and which has the hames-tug ears attached directly to it, as herein shown and described, and for the purpose set forth.

The above specification of my invention signed by me, this 18th day of December, 1868.

B. W. McCLURE.

Witnesses:
L. F. HARTSON,
JAS. A. BRONSON.